Sept. 1, 1925.

O. H. WHITE

GAME

Filed Oct. 16, 1924

INVENTOR
Olga H. White
BY
Marshall & Hawley
ATTORNEYS

Sept. 1, 1925.  
O. H. WHITE  
GAME  
Filed Oct. 16, 1924  
1,552,254  
2 Sheets-Sheet 2

INVENTOR  
Olga H. White  
BY  
Marshall & Hawley  
ATTORNEYS

Patented Sept. 1, 1925.

1,552,254

UNITED STATES PATENT OFFICE.

OLGA H. WHITE, OF NEW YORK, N. Y.

GAME.

Application filed October 16, 1924. Serial No. 743,855.

*To all whom it may concern:*

Be it known that I, OLGA H. WHITE, a citizen of the United States, and a resident of New York, county and State of New York, United States of America, have invented certain new and useful Improvements in Games, of which the following is a specification.

This invention has for its object the provision of an inspirational or educational game which is in such attractive form as to fascinate and hold the attention of children and thereby form an interesting means of inculcating ethical principles in their minds while they are at an impressionable age. To this end, I have invented the game which is described herein which is based upon the story of King Arthur and the Knights of the Round Table or the Search for the Holy Grail,—the Cup of Happiness.

More specifically, the new game comprises a dial which is designed to simulate the historical round table, with symbols on opposite sides thereof, designating desirable and corresponding undesirable attributes of character, with numbers assigning positive and negative values to such attributes, together with a pointed spinner which can be actuated manually. The game also comprises a board upon which is a pictorial representation of a spiral stairway, so colored as to form a basis for a scientific study of colors. The stairway gives the thought of a long upward climb from a low base or beginning of a development, to a desired height or goal. The steps are colored in sections, each section in one of the prismatic colors, beginning with the base color, red, and leading up to the perfect color, or the combination of all colors, white at the top.

In combination with the dial and board are small figures, suitably distinguishable from one another, representing knights who climb the ascent, and a small gold cup, to be placed at the center, or top or ultimate goal, representing the Cup of Happiness, or the desired prize.

With this general outline in mind, I will refer to the drawings and describe my invention more specifically.

Figure 1:
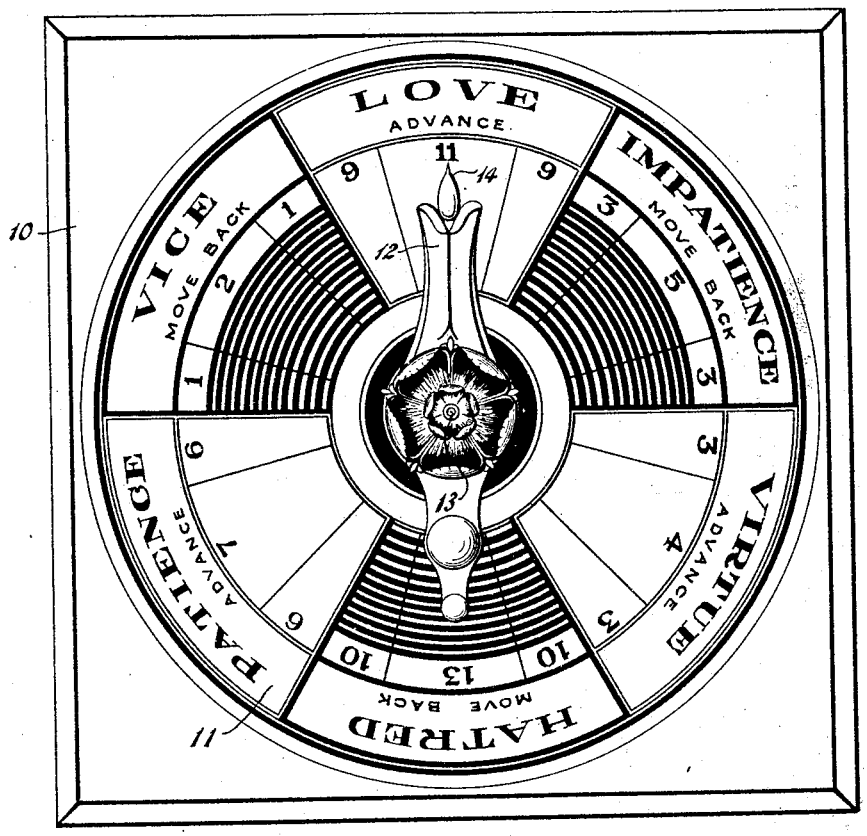
Fig. 1 is a plan view of the dial and the pointer which is to be spun by the players.
Figure 2:
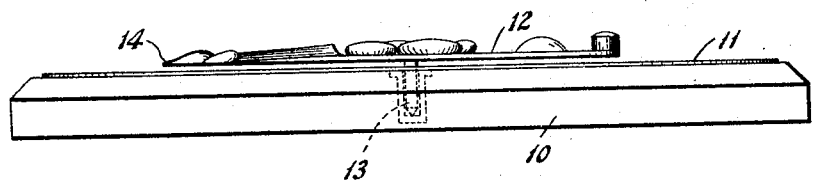
Fig. 2 is an elevation of the device shown in Fig. 1.

Referring now to Fig. 1, 10 designates a base upon which is a circular dial 11 divided into a plurality of sectors lettered to represent opposite virtues and vices, the virtues preferably being represented by a white or light colored sector and the opposite vice by a diametrically opposed dark sector. For example, one of the light sectors may be lettered to represent "Love" and a dark sector opposite it, "Hatred". Other attributes of character chosen for purposes of illustration are "Virtue" and "Vice", also "Patience" and "Impatience".

12 is a balanced spinner, pivoted at 13 in the middle of the dial, and provided with a point 14. I have designed the dial and spinner to resemble the original round table of King Arthur, preserved in the courthouse of the castle of Winchester, England. Further reference to this structure will be made in describing the manner of playing the game.

Figure 3:
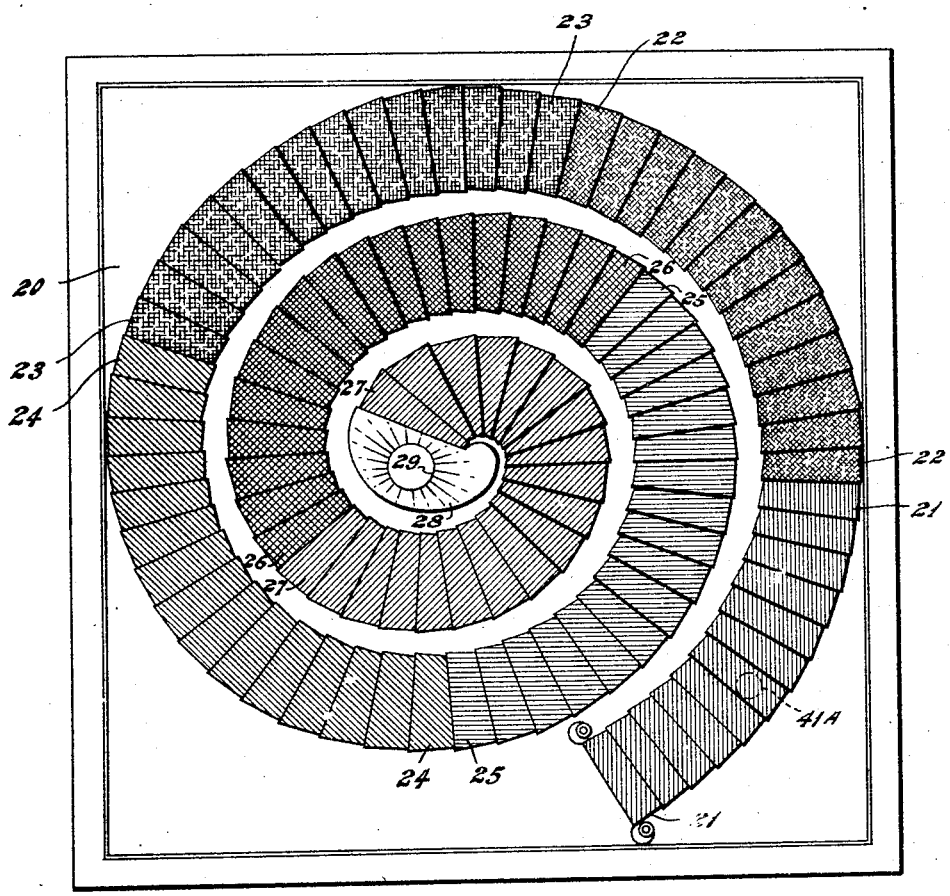
Fig. 3 is a plan view on a reduced scale of the pictorial board.

In Fig. 3 the game board designated by 20 has upon it a pictorial representation of a spiral stairway. The first twelve lower and outer steps 21 are colored red, generally accepted as the most base of the prismatic colors. The next thirteen steps 22 are colored orange. The next fourteen steps 23 are colored yellow. The next fifteen steps 24 are colored green. The next seventeen steps 25 are colored blue. The next eighteen steps 26 are colored indigo. The last nineteen steps 27 are colored violet and the top or goal 28 is white. Upon it is a circle 29 with radiating lines.

Figure 5:
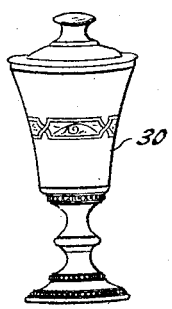
Fig. 5 is an elevational view of the gold cup.

In Fig. 5, 30 is a cup of golden color, of proper size to be set upon the circle 29.

Figure 4:
Fig. 4 is a perspective view of one of the knights or "men".

In Fig. 4, 40 is a small image of a man in knight's regalia, upon a base 41 of sufficient size to hold the image in an upright position. The size of this image is such that four of them may be placed at one time on any one of the steps. The dotted line circle at 41^A in Fig. 3 shows the proportional size of the image to the steps. A plurality of these men is supplied with each game, so differentiated that they may be identified. As a convenient way of accomplishing this, the knights' costumes may include a conspicuous plume 42 and the plumes of the different knights may be of different and readily distinguishable colors.

Having now described the elements of my improved game set, I will describe the manner in which the game is played. One of the players sets the spinner 12 in motion and it will come to rest in a position which cannot be predetermined. Its point 14 will then be over one of the lettered sectors. Each of the sectors which represents a desirable attribute of character is marked "Advance" and each sector is subdivided into smaller sectors, the central one of which is larger than those at the sides thereof. In each of these subdividing sectors are numerals, that on the central subdividing sector being larger than that on those at its sides. If the point has come to rest over the center of the sector "Love," it will indicate the number "11." This means that the player may take his particular knight and move it eleven steps up the spiral stairway. The next player may cause the spinner to come to rest over one of the dark sectors, each of which is lettered "Move back." This will mean that that particular player cannot put his knight upon the stairway.

The next time the first player actuates the spinner he may, for example, cause the point to come to rest over one of the small subdividing sectors, "Impatience" which is numbered "3" and this will mean that his knight must be moved back three steps. It is believed that this is a sufficient description of the manner in which the game is used, but attention is called to the fact that the number of steps of one color is smaller toward the outer or lower part of the spiral stairway than at the upper part, signifying greater difficulty of advancing through a given phase of character toward the end of the accomplishment of a perfect character than at the beginning.

The first player to succeed in moving his knight to the goal 28 is supposed to have developed a perfect character and according to the legend of the Search of the Holy Grail has found the "Cup of Happiness," and in this game is entitled to take the cup 30 or the prize.

Another feature of the dial is that the numbers on the virtues which call for an advance of the men on the stairway, are of a greater total than the sum of the numbers which call for moving back, so that the average of the plays will result in a forward or upward movement of the men. The numbers on the "Hatred" sector are higher than those on any other, so that this sector is to be avoided more than any other.

A desirable feature of this game is that one child can play with it alone, or as many contestants as desired may participate.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A game comprising a dial subdivided into oppositely disposed sectors having words indicating advancement or retrogression, each sector being divided into smaller sectors, the subdivisions of each sector having numbers thereon, and a rotatable spinner, a board bearing a representation of a spiral stairway, and a plurality of images adapted to be moved on the stairway representation in a direction and to a degree indicated by the position of said spinner relative to said sectors.

2. A game comprising a dial subdivided into oppositely disposed sectors having words indicating advancement or retrogression, each sector being unequally divided into smaller sectors, with the larger subdivisions in the middle, the subdivisions of each sector having numbers thereon with the numbers on the larger subdivisions larger than the numbers on the smaller subdivisions and a rotatable spinner, a board bearing a representation of a spiral stairway, and a plurality of images adapted to be moved on the stairway representation in a direction and to a degree indicated by the position of said spinner relative to said sectors, the sum of the numbers indicating advancement being greater than the sum of the numbers indicating retrogression.

3. A game comprising a dial subdivided into oppositely disposed sectors having words indicating advancement or retrogression and numbers thereon, the sum of the numbers indicating advancement being greater than the sum of the numbers indicating retrogression, and a rotatable spinner, a board bearing a representation of a spiral stairway, and a plurality of images adapted to be moved on the stairway representation in a direction and to a degree indicated by the position of said spinner relative to said sectors.

4. A game comprising a dial subdivided into oppositely disposed sectors having words indicating advancement or retrogression, numbers thereon and a rotatable spinner, a board bearing a representation of a spiral stairway, and a plurality of images adapted to be moved on the stairway representation in a direction and to a degree indicated by the position of said spinner relative to said sectors, a goal at the upper end of said stairway and a prize adapted to be placed upon said goal.

5. A game comprising a dial subdivided into oppositely disposed sectors having words indicating advancement or retrogression, numbers thereon and a rotatable spinner, a board bearing a representation of a spiral stairway, and a plurality of images adapted to be moved on the stairway representation in a direction and to a degree indicated by the position of said spinner relative to said sectors, a goal at the upper end of said stairway and a prize adapted to be placed upon said goal, said stairway being subdivided into sections each differently colored.

6. A game comprising a dial subdivided into oppositely disposed sectors having words indicating advancement or retrogression, numbers thereon and a rotatable spinner, a board bearing a representation of a spiral stairway, and a plurality of images adapted to be moved on the stairway representation in a direction and to a degree indicated by the position of said spinner relative to said sectors, a goal at the upper end of said stairway and a prize adapted to be placed upon said goal, said stairway being subdivided into seven sections of an unlike number of steps and each section bearing a different one of the prismatic colors.

7. A game comprising a dial having symbols oppositely disposed thereon designating desirable and corresponding undesirable attributes of character and numbers associated with said symbols assigning positive values to the desirable attributes and negative values to the undesirable attributes, and a pointed spinner, combined with a board bearing a representation of a spiral stairway, and a plurality of images adapted to be moved on the stairway representation in a direction and to a degree indicated by the position of said spinner relative to said numbers.

In witness whereof, I have hereunto set my hand this 15th day of October, 1924.

OLGA H. WHITE.